US012731327B2

(12) United States Patent
Lin et al.

(10) Patent No.: US 12,731,327 B2
(45) Date of Patent: Sep. 8, 2026

(54) METHOD, APPARATUS, DEVICE AND MEDIUM FOR FUR RENDERING

(71) Applicant: Beijing Zitiao Network Technology Co., Ltd., Beijing (CN)

(72) Inventors: Weifeng Lin, Beijing (CN); Yi Guo, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 29 days.

(21) Appl. No.: 18/723,370

(22) PCT Filed: Dec. 16, 2022

(86) PCT No.: PCT/CN2022/139509
§ 371 (c)(1),
(2) Date: Jun. 21, 2024

(87) PCT Pub. No.: WO2023/125064
PCT Pub. Date: Jul. 6, 2023

(65) Prior Publication Data

US 2025/0061645 A1 Feb. 20, 2025

(30) Foreign Application Priority Data

Dec. 29, 2021 (CN) ......................... 202111643628.X

(51) Int. Cl.
*G06T 15/50* (2011.01)
*G06T 15/06* (2011.01)
*G06T 15/80* (2011.01)

(52) U.S. Cl.
CPC ............ *G06T 15/506* (2013.01); *G06T 15/06* (2013.01); *G06T 15/80* (2013.01)

(58) Field of Classification Search
None
See application file for complete search history.

(56) References Cited

U.S. PATENT DOCUMENTS 8,294,713 B1 10/2012 Amanieux
2004/0217957 A1 11/2004 Anderson
(Continued)

FOREIGN PATENT DOCUMENTS

CN 107633544 A 1/2018
CN 109685876 A 4/2019
(Continued)

OTHER PUBLICATIONS

International Patent Application No. PCT/CN2022/139509; Int'l Search Report; dated Feb. 21, 2023; 2 pages.
(Continued)

*Primary Examiner* — Nicholas R Wilson
(74) *Attorney, Agent, or Firm* — BakerHostetler

(57) ABSTRACT

In a method of fur rendering, when the illumination of fur is rendered, for at least one fur rendering layer, vertices corresponding to the fur rendering layer are determined. For at least one vertex in the current fur rendering layer, illumination rendering parameters corresponding to the vertex are determined. The illumination rendering parameters may include one or more illumination rendering sub-item parameters. Different illumination rendering sub-item parameters are used for rendering illumination effects of the fur from different dimensions. After determining the illumination rendering parameters corresponding to each vertex, fur rendering is performed on the fur rendering layer with the illumination rendering parameters corresponding to the vertex. The fur rendering is no longer performed in units of pixel points, and since the number of vertices of the fur rendering layer is less than the number of pixel points, the calculation amount is reduced, and the rendering efficiency is improved.

20 Claims, 5 Drawing Sheets

S201
DETERMINE, FOR AT LEAST ONE FUR RENDERING LAYER, VERTICES CORRESPONDING TO THE FUR RENDERING LAYER

S202
DETERMINE, FOR AT LEAST ONE VERTEX IN THE FUR RENDERING LAYER, ILLUMINATION RENDERING PARAMETERS CORRESPONDING TO THE VERTEX, THE ILLUMINATION RENDERING PARAMETERS COMPRISING ONE OR MORE ILLUMINATION RENDERING SUB-ITEM PARAMETERS

S203
PERFORM, ACCORDING TO THE ILLUMINATION RENDERING PARAMETERS CORRESPONDING TO EACH VERTEX, FUR RENDERING ON THE FUR RENDERING LAYER

(56) References Cited

U.S. PATENT DOCUMENTS

| | | | | |
|---|---|---|---|---|
| 2005/0243088 | A1* | 11/2005 | Lengyel | G06T 17/20 345/428 |
| 2022/0084226 | A1* | 3/2022 | Uludag | G06T 11/40 |

FOREIGN PATENT DOCUMENTS

| | | | |
|---|---|---|---|
| CN | 111145330 | A | 5/2020 |
| CN | 111210497 | A | 5/2020 |
| CN | 111462313 | A | 7/2020 |
| CN | 111862290 | A | 10/2020 |
| CN | 112446943 | A | 3/2021 |
| CN | 113052947 | A | 6/2021 |
| CN | 113379885 | A | 9/2021 |
| CN | 113822981 | A | 12/2021 |

OTHER PUBLICATIONS

China Patent Application No. 202111643628.X; Office Action; dated May 19, 2026; 10 pages.

Yang et al.; “Interactive Fur Shaping and Rendering Using Non-uniform- Layered Textures”; IEEE Computer Graphics and Applications; Jul. 2008; p. 85-93.

* cited by examiner

METHOD, APPARATUS, DEVICE AND MEDIUM FOR FUR RENDERING

CROSS-REFERENCE TO RELATED APPLICATIONS

The present application is the U.S. National Stage of International Application No. PCT/CN2022/139509, filed on Dec. 16, 2022, which claims priority to Chinese Patent Application No. 202111643628.X, filed on Dec. 29, 2021, and entitled "METHOD, APPARATUS, DEVICE AND MEDIUM FOR FUR RENDERING", the entirety of which are incorporated herein by reference in their entireties.

FIELD

The present application relates to computer processing technologies, in particular to a method and an apparatus for fur rendering, a device and a medium.

BACKGROUND

Fur appears very frequently in life, and fur rendering is increasingly applied to the production of movies, games and animation. However, due to complexity of the fur, the fur rendering often requires a larger calculation amount, which affects the working efficiency.

SUMMARY

Given that, embodiments of the present application provide method, apparatus, device and medium for fur rendering to reduce the calculation amount and improve the rendering efficiency.

To achieve this purpose, a solution provided by the embodiments of the present application is as follow.

In a first aspect of the embodiments of the present application, a method of fur rendering is provided. The method may include:

- determining, for at least one fur rendering layer, vertices corresponding to the fur rendering layer;
- determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and
- performing, according to the illumination rendering parameters corresponding to each vertex, fur rendering on the fur rendering layer.

In a second aspect of the embodiments of the present application, an apparatus for fur rendering is provided. The apparatus includes:

- a first determination unit configured for determining, for at least one fur rendering layer, vertices corresponding to the fur rendering layer;
- a second determination unit configured for determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and
- a rendering unit configured for performing, according to the illumination rendering parameters corresponding to each vertex, fur rendering on the fur rendering layer.

In a third aspect of the embodiments of the present application, an electronic device is provided. The device includes: a processor and a memory;

- the memory is configured for storing instructions or computer programs; and
- the processor is configured for executing the instructions or computer programs in the memory, so that the electronic device performs the method of fur rendering described in the first aspect.

In a fourth aspect of the embodiments of the present application, a computer-readable storage medium is provided. The computer-readable storage medium includes instructions which, when run on a computer, cause the computer to perform the method of fur rendering described in the first aspect.

In a fifth aspect of the embodiments of the present application, a computer program product is provided. The computer program product, when run on a computer, cause the computer to perform the method of fur rendering described in the first aspect.

Thus, it can be seen that the embodiments of the present application have the following beneficial effects.

In the technical solution according to the embodiments of the present application, when the illumination of fur is rendered, for at least one fur rendering layer, the vertices corresponding to the fur rendering layer are determined. For at least one vertex in the current fur rendering layer, the illumination rendering parameters corresponding to the vertex are determined, wherein the illumination rendering parameters may include one or more illumination rendering sub-item parameters. Different illumination rendering sub-item parameters are used for rendering illumination effects of the fur from different dimensions. After determining the illumination rendering parameters corresponding to each vertex, fur rendering is performed on the fur rendering layer by using the illumination rendering parameters corresponding to the vertex. That is, during illumination rendering of the fur, the fur rendering is performed with the vertices forming the fur rendering layer as a rendering granularity, the fur rendering is no longer performed in units of pixel points, and since the number of vertices of the fur rendering layer is less than the number of pixel points, the calculation amount is reduced, and the rendering efficiency is improved.

DETAILED DESCRIPTION

In order to make the above objectives, features and advantages of the present application more obvious and easier to understand, the embodiments of the present application will be further described in detail in combination with the accompanying drawings and specific embodiments. It can be understood that the specific embodiments described here are only used for explaining the present application instead of limiting the present application. In addition, it should also be noted that, for the convenience of description, only the parts related to the present application are shown in the accompanying drawings, but not all the structures.

With continuous development of a multimedia technology, the simulation of some characters such as figures or animals often appears in some multimedia videos, and the simulation of fur will inevitably appear in this simulation process. However, in the traditional rendering technology, illumination rendering parameters of fur are determined source by source (each pixel point), and a fur rendering layer includes a large number of pixel points, leading to a large calculation amount.

Based on this, the embodiment of the present application provides a method of fur rendering. For one fur rendering layer, firstly, vertices included in the fur rendering layer are determined, the illumination rendering parameters corresponding to the vertices are determined in units of the vertices, and then the fur rendering layer is subjected to illumination rendering according to the illumination rendering parameters corresponding to each vertex.

Figure 1A:
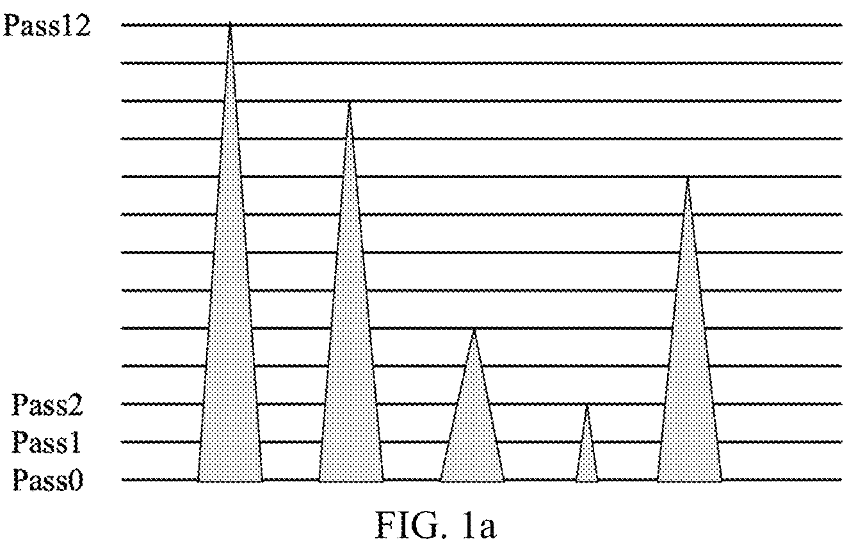
FIG. 1*a* is a multi-pass fur rendering model diagram.
Figure 1B:
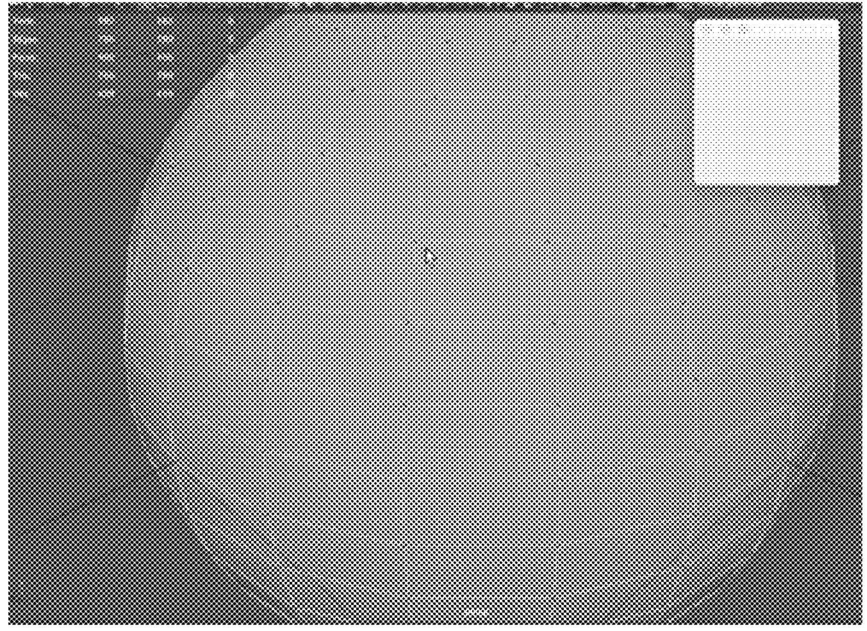
FIG. 1*b* is a schematic diagram of a fur rendering layer according to an embodiment of the present application.

It should be noted that the fur simulation in the embodiment of the present application can be realized based on a multi-pass fur rendering model, that is, the effect of fur simulation is achieved by extrusion through the rendering model in a specific direction for many times, and reducing a transparency layer by layer. For example, as shown in FIG. 1*a*, each Pass represents one fur rendering layer, and the vertices are moved out along a normal when each layer is rendered. In general, the more Passes used, the better the rendering effect. Each fur rendering layer includes a plurality of vertices, as shown in FIG. 1*b*. In the present application, the illumination rendering parameters corresponding to the vertices are determined in units of vertices, and the illumination rendering parameters are no longer determined in units of pixel points, thus reducing the calculation amount. In an actual rendering process, an initial fur rendering layer is continuously expanded outward, so that different fur rendering layers are acquired.

In order to facilitate the understanding of the technical solution according to the embodiments of the present application, description will be made in the following in combination with the accompanying drawings.

Figure 2:
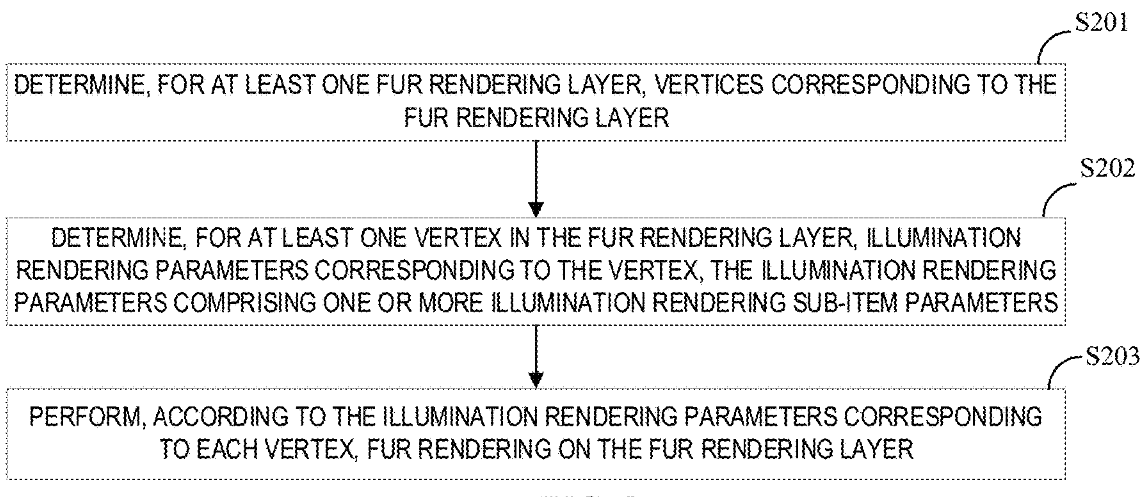
FIG. 2 is a flowchart of a method of fur rendering according to an embodiment of the present application.

Referring to FIG. 2, which is a flowchart of a method of fur rendering according to an embodiment of the present application, the method may be executed by an apparatus for fur rendering, and the apparatus may be implemented by software and/or hardware and be generally integrated in an electronic device. As shown in FIG. 2, the method includes:

S201: for at least one fur rendering layer, the vertices corresponding to the fur rendering layer are determined.

In this embodiment, when fur rendering is performed, generally, the fur rendering is performed layer by layer from the lowest layer. Therefore, when the fur rendering of each layer is performed, for at least one fur rendering layer, the vertices corresponding to the fur rendering layer may be determined. Since each fur rendering layer is acquired based on outward expansion of the previous fur rendering layer, coordinates of the vertices of different fur rendering layers are different relative to the rendering model. Based on this, when the fur rendering layer is rendered, the vertices corresponding to the fur rendering layer are determined. Specifically, the vertices corresponding to one fur rendering layer in the rendering model may be determined, or the respective vertices corresponding to multiple fur rendering layers in the rendering model may be determined.

S202: for at least one vertex in the fur rendering layer, the illumination rendering parameters corresponding to the vertex are determined.

After the vertices corresponding to the fur rendering layer are determined, for at least one vertex, the illumination rendering parameters corresponding to the vertex are determined. The illumination rendering parameters may include one or more illumination rendering sub-item parameters for rendering illumination effects of different dimensions. For example, illumination rendering sub-items may be selected from: an ambient light shading parameter (color value), a diffuse reflection parameter (color value), an ambient light parameter (color value), an anisotropic highlight parameter (color value), a self-shadow parameter (color value) and so on. Specifically, the illumination rendering parameters corresponding to only one certain vertex in the fur rendering layer may be determined, or the illumination rendering parameters corresponding to multiple vertices in the fur rendering layer may be determined.

For the determination of the ambient light shading parameter, the diffuse reflection parameter, the ambient light parameter and the self-shadow parameter, this embodiment provides an implementation solution, which will be explained separately below.

Figure 3A:
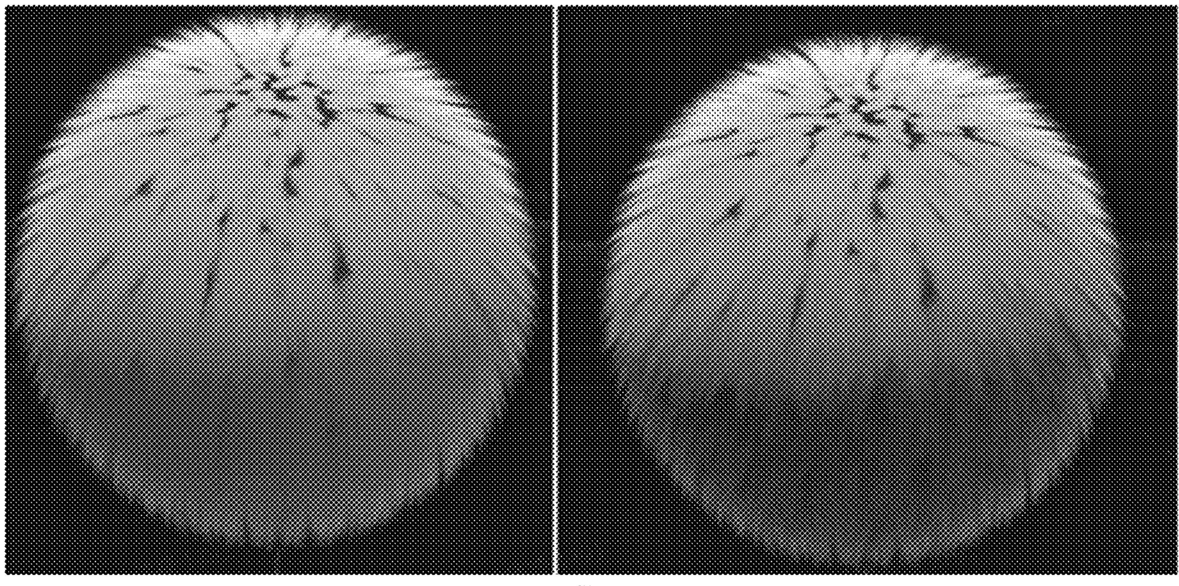
FIG. 3*a* is a fur self-shadow rendering effect diagram according to an embodiment of the present application.

The distance between the vertex and a fur root is determined in response to the illumination rendering sub-item parameters including the ambient light shading parameter; a first parameter affecting an ambient light intensity is determined according to the distance; and the ambient light shading parameter is determined according to the ambient light parameter, the first parameter and a second parameter, the second parameter being used for brightening ambient light. Specifically, a product of the ambient light parameter, the first parameter and the second parameter are taken as the ambient light parameter. For easy understanding, please refer to the following calculation formulas:

$$aoFactor = \text{clamp}(\text{\_FURLEVEL} * \text{\_FURLEVEL} + 0.04,\ 0.0,\ 1.0);$$

$$varAO = \text{mix}(\text{u\_AOColor}.rgb,\ \ vec3(1.0),\ \ aoFactor);$$

$$\text{final\_color} = iblDiffuse * varAO * \text{u\_IBLExposure};$$

wherein, _FURLEVEL represents a coefficient of the current fur rendering layer, and the farther out the fur rendering layer, the larger the corresponding coefficient; clamp is a limiting function, which is used for limiting a calculation result of _FURLEVEL*_FURLEVEL, wherein 1 is output if the calculation result is greater than 1, 0 is output if the calculation result is less than 0, and the calculation result is output if the calculation result is between 0 and 1; and aoFactor is used for representing the distance between the vertex and the fur root;

- varAO represents the first parameter, which can affect the intensity of ambient light; u_AOColor.rgb represents a color value for setting; vec3(1.0) represents white; mix represents an interpolation function; when aoFactor is larger, varAO tends to be white, otherwise varAO tends to be the color set by a user; and
- final_color represents the ambient light shading parameter; iblDiffuse is the ambient light parameter; u_IBLExposure is the second parameter for brightening the ambient light. Referring to FIG. 3*a*, the left figure is a fur schematic diagram without a rendered shading effect, and the right figure is a fur schematic diagram with a rendered shading effect.

A normal direction and an incident light direction are acquired in response to the illumination rendering sub-item parameters including the diffuse reflection parameter; dot product is performed on the normal direction and the incident light direction to acquire a third parameter; and the diffuse reflection parameter is determined according to the third parameter, the coefficient of the fur rendering layer and a light transmission intensity. The third parameter may reflect an included angle between the normal direction and the incident light direction.

Determining the diffuse reflection parameter according to the third parameter, the coefficient of the fur rendering layer and the light transmission intensity may include: multiplying the coefficient of the fur rendering layer by the light transmission intensity to acquire a fourth parameter; adding the third parameter and the fourth parameter to acquire a fifth parameter; taking the fifth parameter as an input of the limiting function, and determining an output of the limiting function as the diffuse reflection parameter. The limiting function is used for limiting the input within a preset data range. For easy understanding, please refer to the following calculation formula:

$$L = \text{normalize(u\_LightDirt); // normalizing incident light}$$

$$NoL = \text{dot}(N, L) * 0.5 + 0.5;$$

$$Vis = \text{clamp}(NoL + \text{\_FURLEVEL} * \text{u\_LightFilter}, 0.0, 1.0);$$

wherein N represents a normal direction vector, L represents an incident light direction vector, and dot is a dot product function. In order to prevent a backlight surface from being too dark, a smaller number of 0.5 is added based on the dot product, and NoL is the third parameter. _FURLEVEL represents the coefficient of the fur rendering layer, u_LightFilter represents the light transmission intensity, _FURLEVEL*u_LightFilter represents the fourth parameter, NoL+_FURLEVEL*u_LightFilter represents the fifth parameter, and Vis represents the diffuse reflection parameter.

Considering that fur diffuse reflection is influenced by an intensity of light source, based on this, the acquired diffuse reflection parameter may also be corrected by the intensity of light source. Specifically, the fifth parameter is taken as the input of the limiting function, and the output of the limiting function is determined as an initial diffuse reflection parameter; and the initial diffuse reflection parameter is multiplied by the light source intensity to acquire the diffuse reflection parameter. For example, the following calculation formula is used:

```
varDiffuse+=Vis*lightFactor//lightFactor represents
    the intensity of light source.
```

In rendering sub-items of the fur diffuse reflection, only the whole fur and the light-dark relationship of the fur from root to top are considered. The fur has a volume per se, and for the backlight part, it is obvious that its brightness is lower than that of the light part. In order to embody the backlight part, in the present application, the noise map is slightly offset, so that there is an overlapping part between the two noise maps before and after the offset, the overlapping part may serve as one backlight surface, and a color value of the backlight surface is determined. Specifically, the fur rendering layer is offset to acquire an offset fur rendering layer; the overlapping part is determined according to the fur rendering layer and the offset fur rendering layer; and according to a difference value between the fur rendering layer and the offset fur rendering layer, the self-shadow parameter of the overlapping part is determined.

Figure 3B:
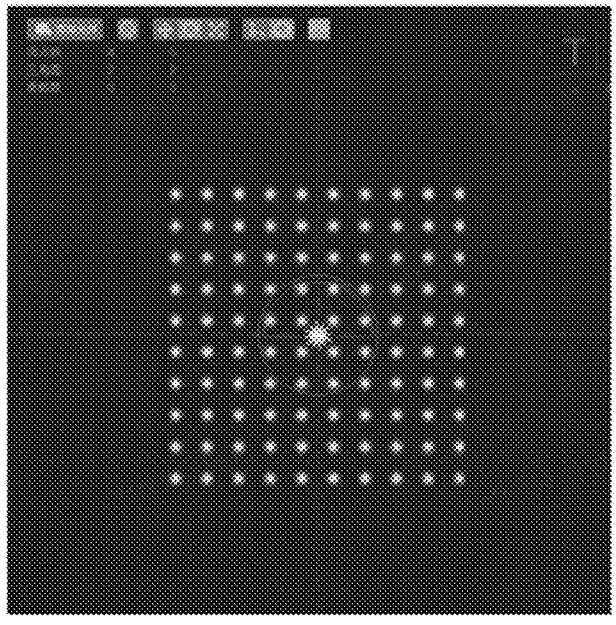
FIG. 3*b* is a noise diagram according to an embodiment of the present application.

When the fur rendering layer is offset, a corresponding offset may be determined by the following manner: converting the incident light direction from a model space to a normal space corresponding to the model space to acquire a converted incident light direction; and offsetting the fur rendering layer with the converted incident light direction as the offset to acquire the offset fur rendering layer. For example, in the noise map before the offset shown in FIG. 3*b*, each point corresponds to one piece of fur, and the noise map is offset along the incident light direction.

Please refer to the following calculation formulas for details:

$$varLightUVoffset = (TBN * modelLightDir).xy;$$

$$singleFurDiffuse = \text{step}(0.0, \text{t\_mask}.r - \text{t\_mask\_lightOffset}.r);$$

wherein modelLightDir represents the incident light direction in the model space; TBN represents a transformation matrix; varLightUVoffset represents the incident light direction in a tangent space; t_mask.r represents the noise map before the offset; t_mask_lightOffset.r represents the noise map after the offset; the step function plays a role of limiting the output data to be greater than or equal to 0. When the difference value of t_mask.r–t_mask_lightOffset.r is greater than 0, the difference value is determined as the self-shadow parameter of the overlapping part. When the difference value of t_mask.r–t_mask_lightoffset.r is less than zero, zero is determined as the self-shadow parameter of the overlapping part.

Figure 3C:
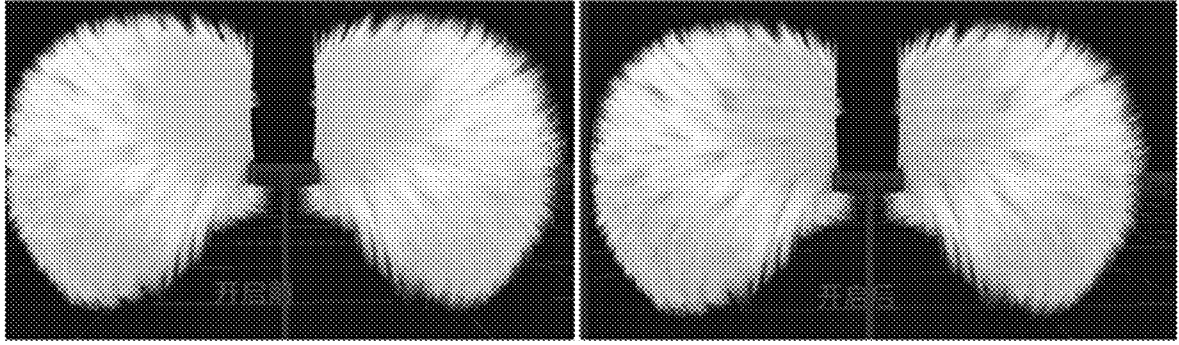
FIG. 3*c* is a fur self-shadow rendering effect diagram according to an embodiment of the present application.

Referring to FIG. 3*c*, the left figure is a fur effect schematic diagram without self-shadow rendering, and the right figure is a fur effect schematic diagram with self-shadow rendering.

In response to the illumination rendering sub-item parameters including the ambient light parameter, the diffuse reflection parameter is added with a sixth parameter and the product of the resulted sum with the ambient light shading parameter is determined as the ambient light parameter. The sixth parameter is a preset color value, which may be set by the user according to an actual application scenario.

Figure 3D:
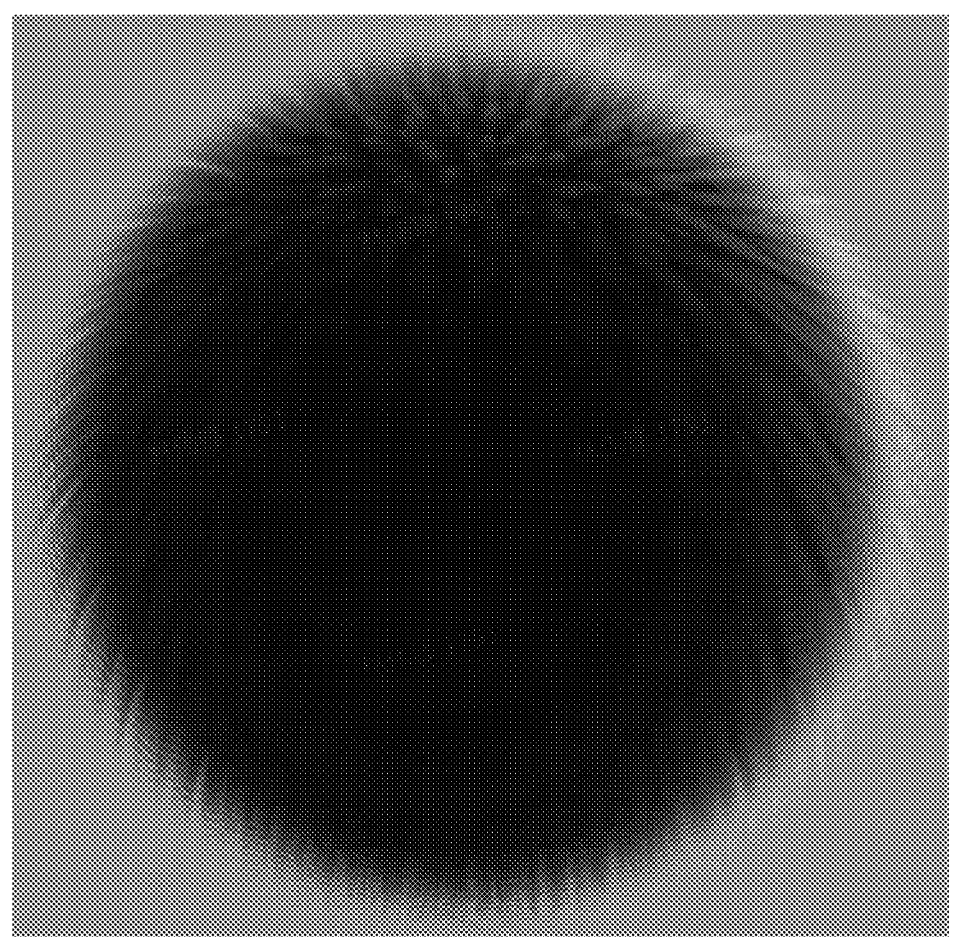
FIG. 3*d* is a fur ambient light effect diagram according to an embodiment of the present application.

Considering that light transmittance at the edge of the fur is higher than that in the middle, the ambient light at the edge is brighter. Based on this, the position of the vertex may be determined according to a dot product result of a visual angle direction and the normal direction. In response to the position of the vertex being in the edge region, the ambient light intensity of the vertex is enhanced. For example, as shown in FIG. 3*d*, the fur at the edge has higher light transmission.

In addition, the anisotropic highlight parameter of the vertex may also be determined, and fur highlight rendering is realized based on the anisotropic highlight parameter. It should be noted that when the anisotropic highlight parameter is determined, the normal direction is replaced by an orientation of the fur, thus ensuring calculation accuracy.

Further, when the vertex has the anisotropic highlight parameter, the diffuse reflection parameter, the anisotropic highlight parameter and the sixth parameter are added, and the product of the resulted sum with the ambient light shading parameter is determined as the ambient light parameter.

S203: fur rendering is performed on the fur rendering layer according to the illumination rendering parameters corresponding to each vertex.

After determining the illumination rendering parameters corresponding to each vertex, the fur rendering layer is subjected to illumination rendering by the illumination rendering parameters of each vertex, so as to acquire more realistic fur.

It should be noted that for the fur rendering between any two vertices, the illumination rendering parameters corresponding to a certain pixel point between the two vertices may be determined by means of interpolating the respective illumination rendering parameters corresponding to the two vertices, so as to realize complete rendering of the fur rendering layer.

It can be seen that when the illumination of the fur is rendered, for at least one fur rendering layer, the vertices corresponding to the fur rendering layer are determined. For at least one vertex in the current fur rendering layer, the illumination rendering parameters corresponding to the vertex are determined; the illumination rendering parameters may include one or more illumination rendering sub-item parameters. Different illumination rendering sub-item parameters are used for rendering illumination effects of the fur from different dimensions. After determining the illumination rendering parameters corresponding to each vertex, fur rendering is performed on the fur rendering layer by using the illumination rendering parameters corresponding to the vertex. That is, during illumination rendering of the fur, the fur rendering is performed with the vertices forming the fur rendering layer as a rendering granularity, the fur rendering is no longer performed in units of pixel points, and since the number of vertices of the fur rendering layer is less than the number of pixel points, the calculation amount is reduced, and the rendering efficiency is improved.

Based on the above method embodiments, the present application embodiments provide an apparatus and electronic device for fur rendering, which will be described below with reference to the accompanying drawings.

Figure 4:
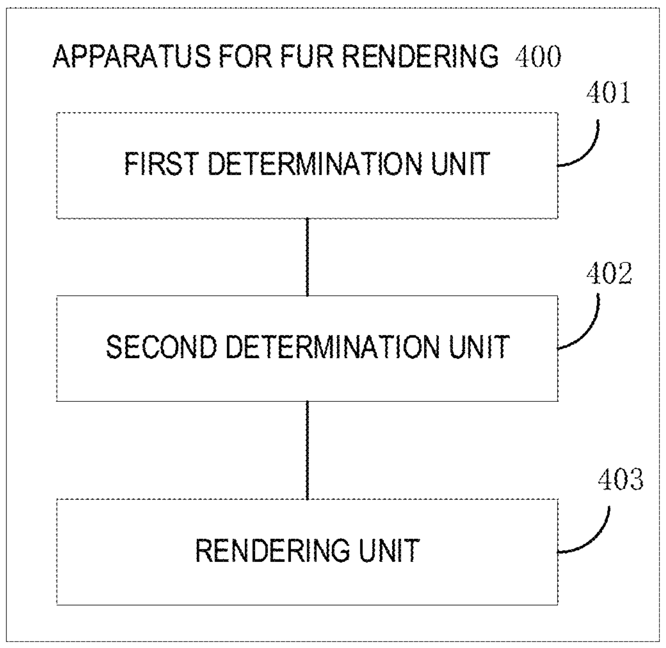
FIG. 4 is a schematic diagram of an apparatus for fur rendering according to an embodiment of the present application.

Referring to FIG. 4, which is a structural diagram of an apparatus for fur rendering provided by the embodiments of the present application. As shown in FIG. 4, the apparatus 400 may include: a first determination unit 401, a second determination unit 402 and a rendering unit 403.

The first determination unit 401 is configured for determining, for at least one fur rendering layer, vertices corresponding to the fur rendering layer.

The second determination unit 402 is configured for determining, for at least one vertex in the fur rendering layer, illumination rendering parameters corresponding to the vertex. The illumination rendering parameters comprise one or more illumination rendering sub-item parameters, and the one or more illumination rendering sub-item parameters are used for rendering illumination effects of different dimensions.

The rendering unit 403 is configured for performing, according to the illumination rendering parameters corresponding to each vertex, fur rendering on the fur rendering layer.

In a possible implementation, the illumination rendering sub-item parameters comprise one or more of: an ambient light shading parameter, a diffuse reflection parameter and an ambient light parameter.

In a possible implementation, the second determination unit 402 is specifically configured for, in response to the illumination rendering sub-item parameters comprising the ambient light shading parameter, determining a distance between the vertex and a fur root; determining, according to the distance, a first parameter affecting an ambient light intensity; and determining, according to the ambient light parameter, the first parameter and a second parameter, the ambient light shading parameter, the second parameter being used for brightening ambient light.

In a possible implementation, the second determination unit 402 is specifically configured for taking a product of the ambient light parameter, the first parameter and the second parameter as the ambient light shading parameter.

In a possible implementation, the second determination unit 402 is specifically configured for, in response to the illumination rendering sub-item parameters comprising the diffuse reflection parameter, acquiring a normal direction and an incident light direction; performing dot product on the normal direction and the incident light direction to acquire a third parameter; and determining, according to the third parameter, a coefficient of the fur rendering layer and a light transmission intensity, the diffuse reflection parameter.

In a possible implementation, the second determination unit 402 is specifically configured for multiplying the coefficient of the fur rendering layer by the light transmission intensity to acquire a fourth parameter; adding the third parameter and the fourth parameter to acquire a fifth parameter; and taking the fifth parameter as an input of a limiting function, and determining an output of the limiting function as the diffuse reflection parameter, the limiting function being used for limiting the input within a preset numerical range.

In a possible implementation, the second determining unit 402 is specifically configured for taking the fifth parameter as the input of the limiting function, and determining the output of the limiting function as an initial diffuse reflection parameter; and multiplying the initial diffuse reflection parameter by a light source intensity to acquire the diffuse reflection parameter.

In a possible implementation, the second determining unit 402 is further configured for offsetting the fur rendering layer to acquire an offset fur rendering layer; determining, according to the fur rendering layer and the offset fur rendering layer, an overlapping part; and determining, according to a difference value between the fur rendering layer and the offset fur rendering layer, a self-shadow parameter of the overlapping part.

In a possible implementation, the second determination unit 402 is specifically configured for converting the incident light direction from a model space to a normal space corresponding to the model space to acquire a converted incident light direction; and offsetting the fur rendering layer with the converted incident light direction as an offset to acquire the offset fur rendering layer.

In a possible implementation, the second determination unit 402 is specifically configured for, in response to the illumination rendering sub-item parameters comprising the ambient light parameter, adding the diffuse reflection parameter to a sixth parameter, and determining a product of the resulted sum with the ambient light shading parameter as the ambient light parameter, the sixth parameter being a preset color value.

In a possible implementation, the apparatus further includes: an enhancement unit;

the second determination unit 402 is further configured for determining, according to a dot product result of a visual angle direction and the normal direction, a position of the vertex; and the enhancement unit is configured for, in response to the position of the vertex being located in an edge region, enhancing an ambient light intensity of the vertex.

It should be noted that the implementation of each unit in this embodiment may be found in the relevant descriptions in the above method embodiments, and this embodiment will not be repeated here.

Figure 5:
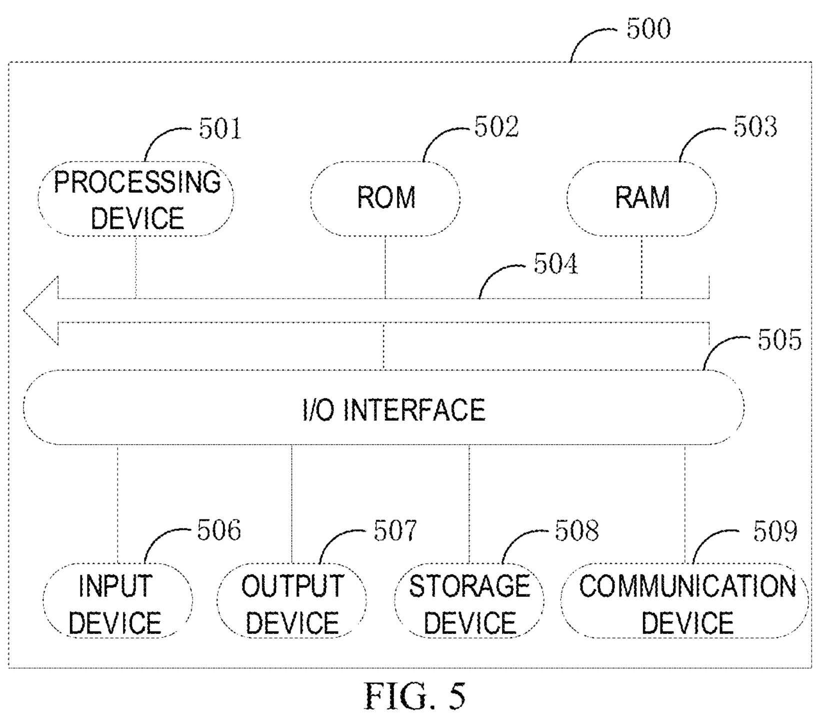
FIG. 5 is schematic diagram of an electronic device according to an embodiment of the present application.

Referring to FIG. 5, which is a schematic structural diagram of an electronic device 500 suitable for implementing the embodiments of the present disclosure. The electronic device in the embodiments of the present disclosure may include, but is not limited to, mobile terminals such as a mobile phone, a notebook computer, a digital broadcast receiver, a personal digital assistant (PDA), a PAD (tablet computer), a portable media player (PMP) and a vehicle-mounted terminal (for example, a vehicle-mounted navigation terminal), and fixed terminals such as a digital television (TV) and a desktop computer. The electronic device shown in FIG. 5 is merely an example and should not impose any restrictions on the functions and scope of use of the embodiments of the present application.

As shown in FIG. 5, the electronic device 500 may include a processing device (such as a central processing unit and a graphics processor) 501, which may execute various appropriate actions and processing according to a program stored in a read-only memory (ROM) 502 or a program loaded to a random access memory (RAM) 503 from a storage device 508. Various programs and data required during operation of the electronic device 500 are also stored in the RAM 503. The processing device 501, the ROM 502 and the RAM 503 are connected with one another via a bus 504. An input/output (I/O) interface 505 is also connected to the bus 504.

Generally, the following apparatuses may be connected to the I/O interface 505: an input device 506 including for example a touch screen, a touch pad, a keyboard, a mouse, a camera, a microphone, an accelerometer and a gyroscope; an output device 507 including for example a liquid crystal display (LCD), a speaker and a vibrator; a storage device 508 including for example a magnetic tape and a hard disk; and a communication device 509. The communication device 509 may allow wireless or wired communication between the electronic device 500 and other devices for data exchange. Although FIG. 5 shows the electronic device 500 having various devices, it should be understood that not all the devices shown are necessarily required to be implemented or provided. More or fewer devices may alternatively be implemented or provided.

In particular, according to the embodiments of the present disclosure, the process described above with reference to the flowcharts may be implemented as a computer software program. For example, an embodiment of the present disclosure provides a computer program product including a computer program carried on a non-transient computer-readable medium. The computer program includes a program code for executing the methods shown in the flowcharts. In such an embodiment, the computer program may be downloaded and installed from the network via the communication device 509, or installed from the storage device 508, or installed from the ROM 502. The computer program, when executed by the processing unit 501, causes the processing unit to execute the above functions defined in the methods according to the embodiments of the present disclosure.

The electronic device provided by the embodiments of this application and the method of fur rendering provided by the above-mentioned embodiments belong to the same inventive concept. Technical details not described in detail in this embodiment can be found in the above-mentioned embodiments, and this embodiment has the same beneficial effects as the above-mentioned embodiments.

The embodiments of this application provide a computer-readable medium on which a computer program is stored, wherein when the program is executed by a processor, the method of fur rendering described in any of the above embodiments is implemented.

It should be noted that the computer-readable medium according to the present disclosure may be a computer-readable signal medium or a computer-readable storage medium or any combination of the two. The computer-readable storage medium may be, for example, but is not limited to, an electrical, magnetic, optical, electromagnetic, infrared, or semiconductor system, apparatus, or device, or any combination thereof. More specific examples of the computer-readable storage medium include but are not limited to: an electrical connection with at least one wire, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium that contains or stores a program. The program may be used by or used in combination with an instruction execution system, apparatus, or device. However, in the present disclosure, the computer-readable signal medium may include a data signal propagated in baseband or as a part of a carrier wave, and computer-readable program code is carried therein. This propagated data signal may take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program used by or used in combination with the instruction execution system, apparatus, or device. The program code contained on the computer-readable medium may be transmitted by any suitable medium, including but not limited to, wire, optical cable, RF, etc., or any suitable combination thereof.

In some implementations, a client and server may communicate using any currently known or future developed network protocol such as HTTP (HyperText Transfer Protocol) and may interconnect with any form or medium of digital data communication (such as communication networks). Examples of communication networks include Local Area Networks (LANs), Wide Area Networks (WANs), the Internet (such as the Internet), and end-to-end networks (such as ad hoc end-to-end networks), as well as any network currently known or future developed.

The computer-readable medium may be included in the electronic device described above; or it may stand alone without being assembled into the electronic device.

The computer-readable medium carries one or more programs. When the one or more programs are executed by the electronic device, the electronic device performs the method of fur rendering.

The computer program code for performing the operations of the present disclosure may be written in one or more programming languages or a combination thereof, which include but are not limited to object-oriented programming languages Java, Smalltalk, C++, and conventional procedural programming languages such as "C" or similar programming languages. The program codes may be executed completely on a user computer, partially on a user computer, as an independent package, partially on a user computer and partially on a remote computer, or completely on a remote computer or server. In cases involving a remote computer, the remote computer may be connected to a user computer through any type of network, including a local area network (LAN) or a wide area network (WAN), or may be connected to an external computer (for example, through the Internet by using an Internet service provider).

The flowcharts and the block diagrams in the drawings illustrate system architectures, functions and operations that may be implemented based on the system, method, and computer program product according to various embodiments of the present disclosure. In this regard, each block in the flowcharts or the block diagrams can represent one module, a program segment or a part of a code, and the module, the program segment or the part of the code includes at least one executable instruction for implementing specific logic functions. It should also be noted that, in some alternative implementations, the functions noted in the blocks may also occur in a sequence different from those illustrated in the drawings. For example, two consecutive blocks may be executed substantially in parallel, and may sometimes be executed in an opposite order, depending on the functions involved. It should also be noted that each block in the block diagrams and/or the flowcharts, and combinations of the blocks in the block diagrams and/or the flowcharts can be implemented in a dedicated hardware-based system that performs the specified functions or operations, or can be implemented by the combination of dedicated hardware and computer instructions.

The units involved in the embodiments described in this application may be implemented in software or hardware. Herein, the name of the unit/module does not constitute a limitation on the unit itself in some cases. For example, a voice data collection module may further be described as "a data collection module".

The functions described above herein may be at least partially performed by one or more hardware logic components. For example, non-restrictively, example types of hardware logic components that may be used include: a field programmable gate array (FPGA), an application-specific integrated circuit (ASIC), an application-specific standard parts (ASSP), a system-on-chip (SOC), a complex programmable logic device (CPLD), and the like.

In the context of the present disclosure, the machine-readable medium may be a tangible medium that may contain or store a program used by or used in combination with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or a flash memory), an optical fiber, a portable compact disk read-only memory (CD-ROM), an optical storage device, a magnetic storage device, or any suitable combination thereof.

According to one or more embodiments of the present application, a method of fur rendering is provided. The method includes:

- determining, for at least one fur rendering layer, vertices corresponding to the fur rendering layer;
- determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and
- performing, according to the illumination rendering parameters corresponding to each vertex, fur rendering on the fur rendering layer.

According to one or more embodiments of the present application, the illumination rendering sub-item parameters comprise one or more of: an ambient light shading parameter, a diffuse reflection parameter and an ambient light parameter.

According to one or more embodiments of this application, determining the illumination rendering parameters corresponding to the vertex includes:

- in response to the illumination rendering sub-item parameters comprising the ambient light shading parameter, determining a distance between the vertex and a fur root;
- determining, according to the distance, a first parameter affecting an ambient light intensity; and
- determining, according to the ambient light parameter, the first parameter and a second parameter, the ambient light shading parameter, the second parameter being used for brightening ambient light.

According to one or more embodiments of the present application, determining, according to the ambient light parameter, the first parameter and the second parameter, the ambient light shading parameter includes:

- taking a product of the ambient light parameter, the first parameter and the second parameter as the ambient light shading parameter.

According to one or more embodiments of this application, determining the illumination rendering parameters corresponding to the vertex includes:

- in response to the illumination rendering sub-item parameters comprising the diffuse reflection parameter, acquiring a normal direction and an incident light direction;
- performing dot product on the normal direction and the incident light direction to acquire a third parameter; and
- determining, according to the third parameter, a coefficient of the fur rendering layer and a light transmission intensity, the diffuse reflection parameter.

According to one or more embodiments of the present application, determining, according to the third parameter, the coefficient of the fur rendering layer and the light transmission intensity, the diffuse reflection parameter includes:

Multiply the coefficient of the fluff rendering layer and the light transmission intensity to obtain a fourth parameter;

multiplying the coefficient of the fur rendering layer by the light transmission intensity to acquire a fourth parameter;

adding the third parameter and the fourth parameter to acquire a fifth parameter; and taking the fifth parameter as an input of a limiting function, and determining an output of the limiting function as the diffuse reflection parameter, the limiting function being used for limiting the input within a preset numerical range.

According to one or more embodiments of the present application, taking the fifth parameter as the input of the limiting function and determining the output of the limiting function as the diffuse reflection parameter includes:

taking the fifth parameter as the input of the limiting function, and determining the output of the limiting function as an initial diffuse reflection parameter; and multiplying the initial diffuse reflection parameter by a light source intensity to acquire the diffuse reflection parameter.

According to one or more embodiments of the present application, the method further includes:

offsetting the fur rendering layer to acquire an offset fur rendering layer;

determining, according to the fur rendering layer and the offset fur rendering layer, an overlapping part; and determining, according to a difference value between the fur rendering layer and the offset fur rendering layer, a self-shadow parameter of the overlapping part.

According to one or more embodiments of the present application, offsetting the fur rendering layer to acquire the offset fur rendering layer includes:

converting the incident light direction from a model space to a normal space corresponding to the model space to acquire a converted incident light direction; and offsetting the fur rendering layer with the converted incident light direction as an offset to acquire the offset fur rendering layer.

According to one or more embodiments of this application, determining the illumination rendering parameters corresponding to the vertex includes:

in response to the illumination rendering sub-item parameters comprising the ambient light parameter, adding the diffuse reflection parameter to a sixth parameter, and determining a product of the resulted sum with the ambient light shading parameter as the ambient light parameter, the sixth parameter being a preset color value.

According to one or more embodiments of the present application, the method further includes:

determining, according to a dot product result of a visual angle direction and the normal direction, a position of the vertex; and in response to the position of the vertex being located in an edge region, enhancing an ambient light intensity of the vertex.

According to one or more embodiments of the present application, an apparatus for fur rendering device is provided. The apparatus includes:

a first determination unit configured for determining, for at least one fur rendering layer, vertices corresponding to the fur rendering layer;

a second determination unit configured for determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and a rendering unit configured for performing, according to the illumination rendering parameters corresponding to each vertex, fur rendering on the fur rendering layer.

According to one or more embodiments of the present application, the illumination rendering sub-item parameters comprise one or more of: an ambient light shading parameter, a diffuse reflection parameter and an ambient light parameter.

According to one or more embodiments of the present application, the second determination unit is specifically configured for, in response to the illumination rendering sub-item parameters comprising the ambient light shading parameter, determining a distance between the vertex and a fur root; determining, according to the distance, a first parameter affecting an ambient light intensity; and determining, according to the ambient light parameter, the first parameter and a second parameter, the ambient light shading parameter, the second parameter being used for brightening ambient light.

According to one or more embodiments of the present application, the second determination unit is specifically configured for taking a product of the ambient light parameter, the first parameter and the second parameter as the ambient light shading parameter.

According to one or more embodiments of the present application, the second determination unit is specifically configured for, in response to the illumination rendering sub-item parameters comprising the diffuse reflection parameter, acquiring a normal direction and an incident light direction; performing dot product on the normal direction and the incident light direction to acquire a third parameter; and determining, according to the third parameter, a coefficient of the fur rendering layer and a light transmission intensity, the diffuse reflection parameter.

According to one or more embodiments of the present application, the second determination unit is specifically configured for multiplying the coefficient of the fur rendering layer by the light transmission intensity to acquire a fourth parameter; adding the third parameter and the fourth parameter to acquire a fifth parameter; and taking the fifth parameter as an input of a limiting function, and determining an output of the limiting function as the diffuse reflection parameter, the limiting function being used for limiting the input within a preset numerical range.

According to one or more embodiments of the present application, the second determination unit is specifically configured for taking the fifth parameter as the input of the limiting function, and determining the output of the limiting function as an initial diffuse reflection parameter; and multiplying the initial diffuse reflection parameter by a light source intensity to acquire the diffuse reflection parameter.

According to one or more embodiments of the present application, the second determination unit is further configured for offsetting the fur rendering layer to acquire an offset fur rendering layer; determining, according to the fur rendering layer and the offset fur rendering layer, an overlapping part; and determining, according to a difference value between the fur rendering layer and the offset fur rendering layer, a self-shadow parameter of the overlapping part.

According to one or more embodiments of the present application, the second determination unit is specifically configured for converting the incident light direction from a model space to a normal space corresponding to the model space to acquire a converted incident light direction; and offsetting the fur rendering layer with the converted incident light direction as an offset to acquire the offset fur rendering layer.

According to one or more embodiments of the present application, the second determination unit is specifically configured for, in response to the illumination rendering sub-item parameters comprising the ambient light parameter, adding the diffuse reflection parameter to a sixth parameter, and determining a product of the resulted sum with the ambient light shading parameter as the ambient light parameter, the sixth parameter being a preset color value.

According to one or more embodiments of the present application, the apparatus further includes: an enhancement unit;

the second determination unit 402 is further configured for determining, according to a dot product result of a visual angle direction and the normal direction, a position of the vertex; and the enhancement unit is configured for, in response to the position of the vertex being located in an edge region, enhancing an ambient light intensity of the vertex.

According to one or more embodiments of the present application, an electronic device includes: a processor and a memory;

the memory is configured for storing instructions or computer programs; and the processor is configured for executing the instructions or computer programs in the memory, so that the electronic device performs the method of fur rendering.

According to one or more embodiments of the present application, a computer-readable storage medium includes instructions which, when run on a computer, cause the computer to perform the method of fur rendering described above.

It should be noted that each embodiment is described in a progressive manner in this specification. Each embodiment focuses on its differences from other embodiments. The same and similar parts between each embodiment can be referred to each other. For the system or apparatus disclosed by the embodiments, since it corresponds to the method disclosed by the embodiments, the description is relatively simple. For relevant details, please refer to the description of the method section.

It should be understood that in this application, "at least one (item)" refers to one or more, and "plurality" refers to two or more. "And/or" is used to describe the association relationship between associated objects, indicating that there can be three relationships. For example, "A and/or B" may represent: only A exists, only B exists, and A and B exist simultaneously, where A and B may be singular or plural. The character "/" generally indicates that the related objects are in an "or" relationship. "At least one of (items)" or similar expressions thereof refers to any combination of these items, including any combination of a single item or a plurality of items. For example, at least one (item) of a, b or c may represent: a, b, c, "a and b", "a and c", "b and c", or "a and b and c", where a, b, c may be single or multiple.

It should also be noted that herein, relational terms such as first and second are only used to distinguish one entity or operation from another entity or operation, and do not necessarily require or imply any actual relationship or order between these entities or operations. Furthermore, the terms "includes", "including" or any other variations thereof are intended to cover a non-exclusive inclusion such that a process, method, article, or device that includes a list of elements includes not only those elements, but also includes other elements that are not explicitly listed, or also includes elements inherent to such process, method, item, or device. Without further limitation, an element defined by the statement "includes a . . . " does not exclude the existence of other identical elements in the process, method, item, or device that includes the said elements.

The steps of the methods or algorithms described in conjunction with the embodiments disclosed herein may be implemented directly in hardware, in software modules executed by a processor, or in a combination of the two. The software modules may be located in a random access memory (RAM), memory, read-only memory (ROM), electrically programmable ROM, electrically erasable programmable ROM, register, hard disk, removable disk, CD-ROM, or any other form of storage media commonly known in the technical field.

The above description of the disclosed embodiments enables those skilled in the art to implement or use the present application. Various modifications to these embodiments will be apparent to those skilled in the art, and the general principles defined herein may be implemented in other embodiments without departing from the spirit or scope of the application. Therefore, the present application is not to be limited to the embodiments shown herein but is to be accorded the widest scope consistent with the principles and novel features disclosed herein.

What is claimed is:

1. A method of fur rendering, comprising:

determining, for at least one fur rendering layer, vertices corresponding to the fur rendering layer;

determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and performing, according to the illumination rendering parameters corresponding to each vertex, fur rendering on the fur rendering layer, wherein determining the illumination rendering parameters corresponding to the vertex comprises:

determining a distance between the vertex and a fur root in response to the illumination rendering sub-item parameters comprising an ambient light shading parameter, determining, based on the distance, a first parameter affecting an ambient light intensity, and determining the ambient light shading parameter based on an ambient light parameter, the first parameter, and a second parameter for brightening ambient light.

2. The method of claim 1, wherein determining the ambient light shading parameter based on the ambient light parameter, the first parameter, and the second parameter comprises:

taking a product of the ambient light parameter, the first parameter and the second parameter as the ambient light shading parameter.

3. The method of claim 1, wherein determining the illumination rendering parameters corresponding to the vertex comprises:

acquiring a normal direction and an incident light direction in response to the illumination rendering sub-item parameters comprising a diffuse reflection parameter;

performing dot product on the normal direction and the incident light direction to acquire a third parameter; and determining the diffuse reflection parameter based on, according to the third parameter, a coefficient of the fur rendering layer and a light transmission intensity.

4. The method of claim 3, wherein determining the diffuse reflection parameter based on the third parameter, the coefficient of the fur rendering layer and the light transmission intensity comprises:

multiplying the coefficient of the fur rendering layer by the light transmission intensity to acquire a fourth parameter;

adding the third parameter and the fourth parameter to acquire a fifth parameter; and taking the fifth parameter as an input of a limiting function, and determining an output of the limiting function as the diffuse reflection parameter, the limiting function being used for limiting the input within a preset numerical range.

5. The method of claim 4, wherein taking the fifth parameter as the input of the limiting function and determining the output of the limiting function as the diffuse reflection parameter comprises:

taking the fifth parameter as the input of the limiting function, and determining the output of the limiting function as an initial diffuse reflection parameter; and multiplying the initial diffuse reflection parameter by a light source intensity to acquire the diffuse reflection parameter.

6. The method of claim 1, wherein the method further comprises:

offsetting the fur rendering layer to acquire an offset fur rendering layer;

determining, according to the fur rendering layer and the offset fur rendering layer, an overlapping part; and determining, according to a difference value between the fur rendering layer and the offset fur rendering layer, a self-shadow parameter of the overlapping part.

7. The method of claim 6, wherein offsetting the fur rendering layer to acquire the offset fur rendering layer comprises:

converting the incident light direction from a model space to a normal space corresponding to the model space to acquire a converted incident light direction; and offsetting the fur rendering layer with the converted incident light direction as an offset to acquire the offset fur rendering layer.

8. The method of claim 1, wherein the method further comprises:

adding a diffuse reflection parameter to a sixth parameter, and determining a product of a resulted sum with the ambient light shading parameter as the ambient light parameter, the sixth parameter being a preset color value.

9. The method of claim 1, wherein the method further comprises:

determining, according to a dot product result of a visual angle direction and a normal direction, a position of the vertex; and in response to the position of the vertex being located in an edge region, enhancing an ambient light intensity of the vertex.

10. An electronic device comprising: a processor and a memory; wherein the memory is configured for storing instructions or computer programs; and the processor is configured for executing the instructions or computer programs in the memory, so that the electronic device performs acts of fur rendering, the acts comprising:

determining, for at least one fur rendering layer, vertices corresponding to the fur rendering layer;

determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and performing, according to the illumination rendering parameters corresponding to each vertex, fur rendering on the fur rendering layer, wherein determining the illumination rendering parameters corresponding to the vertex comprises:

determining a distance between the vertex and a fur root in response to the illumination rendering sub-item parameters comprising an ambient light shading parameter, determining, based on the distance, a first parameter affecting an ambient light intensity, and determining the ambient light shading parameter based on an ambient light parameter, the first parameter, and a second parameter for brightening ambient light.

11. The device of claim 10, wherein determining the ambient light shading parameter based on the ambient light parameter, the first parameter, and the second parameter comprises:

taking a product of the ambient light parameter, the first parameter and the second parameter as the ambient light shading parameter.

12. The device of claim 10, wherein determining the illumination rendering parameters corresponding to the vertex comprises:

acquiring a normal direction and an incident light direction in response to the illumination rendering sub-item parameters comprising a diffuse reflection parameter;

performing dot product on the normal direction and the incident light direction to acquire a third parameter; and determining the diffuse reflection parameter based on the third parameter, a coefficient of the fur rendering layer and a light transmission intensity.

13. The device of claim 12, wherein determining the diffuse reflection parameter based on the third parameter, the coefficient of the fur rendering layer and the light transmission intensity comprises:

multiplying the coefficient of the fur rendering layer by the light transmission intensity to acquire a fourth parameter;

adding the third parameter and the fourth parameter to acquire a fifth parameter; and taking the fifth parameter as an input of a limiting function, and determining an output of the limiting function as the diffuse reflection parameter, the limiting function being used for limiting the input within a preset numerical range.

14. The device of claim 13, wherein taking the fifth parameter as the input of the limiting function and determining the output of the limiting function as the diffuse reflection parameter comprises:

taking the fifth parameter as the input of the limiting function, and determining the output of the limiting function as an initial diffuse reflection parameter; and multiplying the initial diffuse reflection parameter by a light source intensity to acquire the diffuse reflection parameter.

15. The device of claim 10, wherein the acts further comprise:

offsetting the fur rendering layer to acquire an offset fur rendering layer;

determining, according to the fur rendering layer and the offset fur rendering layer, an overlapping part; and determining, according to a difference value between the fur rendering layer and the offset fur rendering layer, a self-shadow parameter of the overlapping part.

16. A non-transitory computer readable storage medium comprising instructions which, when run on a computer, cause the computer to perform acts of fur rendering, the acts comprising:

determining, for at least one fur rendering layer, vertices corresponding to the fur rendering layer;

determining, for at least one vertex in the fur rendering layer, illumination rendering parameters corresponding to the vertex, the illumination rendering parameters comprising one or more illumination rendering sub-item parameters, and the one or more illumination rendering sub-item parameters being used for rendering illumination effects of different dimensions; and performing, according to the illumination rendering parameters corresponding to each vertex, fur rendering on the fur rendering layer, wherein determining the illumination rendering parameters corresponding to the vertex comprises:

determining a distance between the vertex and a fur root in response to the illumination rendering sub-item parameters comprising an ambient light shading parameter, determining, based on the distance, a first parameter affecting an ambient light intensity, and determining the ambient light shading parameter based on an ambient light parameter, the first parameter, and a second parameter for brightening ambient light.

17. The non-transitory computer readable storage medium of claim 16, wherein determining the ambient light shading parameter based on the ambient light parameter, the first parameter, and the second parameter comprises:

computing a product of the ambient light parameter, the first parameter, and the second parameter as the ambient light shading parameter.

18. The non-transitory computer readable storage medium of claim 16, wherein determining the illumination rendering parameters corresponding to the vertex further comprises:

acquiring a normal direction and an incident light direction in response to the illumination rendering sub-item parameters comprising a diffuse reflection parameter;

performing dot product on the normal direction and the incident light direction to acquire a third parameter; and determining the diffuse reflection parameter based on to the third parameter, a coefficient of the at least one fur rendering layer, and a light transmission intensity.

19. The non-transitory computer readable storage medium of claim 16, wherein the acts further comprise:

offsetting the fur rendering layer to acquire an offset fur rendering layer;

determining, according to the fur rendering layer and the offset fur rendering layer, an overlapping part; and determining, according to a difference value between the fur rendering layer and the offset fur rendering layer, a self-shadow parameter of the overlapping part.

20. The non-transitory computer readable storage medium of claim 16, wherein the acts further comprise:

determining, according to a dot product result of a visual angle direction and a normal direction, a position of the vertex; and in response to the position of the vertex being located in an edge region, enhancing an ambient light intensity of the vertex.

* * * * *